US008275904B2

(12) United States Patent
Ikeda

(10) Patent No.: US 8,275,904 B2
(45) Date of Patent: Sep. 25, 2012

(54) WIRELESS COMMUNICATION DEVICE AND INFORMATION PROCESSING METHOD

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 11/398,621

(22) Filed: Apr. 6, 2006

(65) Prior Publication Data

US 2006/0252413 A1 Nov. 9, 2006

(30) Foreign Application Priority Data

Apr. 8, 2005 (JP) ................................ 2005-112659

(51) Int. Cl.
*G01R 31/08* (2006.01)

(52) U.S. Cl. .................................... 709/236; 370/230.1

(58) Field of Classification Search .................. 709/205, 709/230–237
See application file for complete search history.

(56) References Cited

U.S. PATENT DOCUMENTS

| | | | | |
|---|---|---|---|---|
| 5,475,744 | A | 12/1995 | Ikeda | 375/127 |
| 6,144,669 | A * | 11/2000 | Williams et al. | 370/401 |
| 6,438,610 | B1 * | 8/2002 | Pearson et al. | 709/247 |
| 6,622,172 | B1 * | 9/2003 | Tam | 709/232 |
| 7,680,141 | B2 * | 3/2010 | Miyake et al. | 370/428 |
| 2002/0046272 | A1 | 4/2002 | Ikeda | 709/223 |
| 2002/0169990 | A1 * | 11/2002 | Sherburne, Jr. | 713/300 |
| 2004/0064607 | A1 * | 4/2004 | Odakura et al. | 710/57 |
| 2005/0021830 | A1 * | 1/2005 | Urzaiz et al. | 709/234 |
| 2005/0058104 | A1 * | 3/2005 | Yomo et al. | 370/335 |
| 2005/0141551 | A1 * | 6/2005 | McNeil et al. | 370/466 |
| 2006/0149821 | A1 * | 7/2006 | Rajan et al. | 709/206 |
| 2006/0291435 | A1 * | 12/2006 | Hirsimaki et al. | 370/338 |

FOREIGN PATENT DOCUMENTS

| | | | |
|---|---|---|---|
| EP | 1233594 | | 8/2002 |
| EP | 1233594 | A1 * | 8/2002 |
| JP | 08-194582 | | 7/1996 |
| JP | 2001-051803 | | 2/2001 |
| WO | WO 03/081873 | * | 10/2003 |
| WO | WO 03081873 | * | 10/2003 |
| WO | WO 2005050928 | * | 6/2005 |

* cited by examiner

*Primary Examiner* — Ian N Moore
*Assistant Examiner* — Thai Nguyen
(74) *Attorney, Agent, or Firm* — Fitzpatrick, Cella, Harper & Scinto

(57) ABSTRACT

When an object file is to be transferred, a wireless communication device which supports a plurality of different protocols shortens a transfer time. The wireless communication device according to this invention includes a unit which receives object data, a unit which stores the received object data, and a unit which, when a predetermined amount of object data is stored, divides the object data into blocks, and transmits the object data to a wireless controller. The wireless communication device is characterized in that upon reception of the object data, the wireless controller monitors a reply interval of ACK to be replied, and changes, based on the reply interval, the amount of the object data to be stored.

4 Claims, 12 Drawing Sheets

WIRELESS COMMUNICATION DEVICE AND INFORMATION PROCESSING METHOD

FIELD OF THE INVENTION

The present invention relates to a data processing technique for performing wireless communication.

BACKGROUND OF THE INVENTION

Based on a Bluetooth standard, an OPP (Object Push Profile) is defined as a versatile communication profile used to transmit/receive object data such as image data. In contrast to this, recently, a BIP (Basic Imaging Profile) has been developed as a communication profile dedicated to image data transfer. Upon using this BIP, various negotiations about the format, size, and the like of image data to be transmitted can be performed. Also, this BIP has also been studied to be used as the communication profile in image data wireless transmission between the digital camera and the printer device.

FIG. 2 is a schematic view showing a conventional Bluetooth wireless communication system. In FIG. 2, a notebook PC 201 connects with a Bluetooth device as a USB-adapter access point device which supports both the protocols BIP and OPP. A wireless printer device 202 incorporates a Bluetooth device which supports the BIP. Each of a wireless digital camera 203 and a cellular phone 204 incorporates a Bluetooth device which supports the OPP.

Since the notebook PC 201 supports both the protocols BIP and OPP, it can transmit/receive object data to/from the wireless printer device 202, wireless digital camera 203, and cellular phone 204.

The wireless printer device 202 supports a communication protocol different from that of the wireless digital camera 203 and cellular phone 20.4. Hence, the wireless digital camera 203 and the cellular phone 204 can neither directly transmit object data to the wireless printer device 202 nor output an image file or the like. Therefore, in order to output the image file or the like to the wireless printer device 202, the object data to be output must be temporarily transferred and saved in the notebook PC 201. After that, the object data must be transferred to the wireless printer device 202 by using a communication application on the notebook PC 201. Hence, strong demand has arisen for a short object data transfer time.

Under these circumstances, some schemes for shortening the transfer time have been proposed. For example, Japanese Patent Laid-Open No. 2001-051803 discloses a block data transfer mechanism for forming composite variable length block data by collecting a plurality of block data when small-size or unfixed-size block data are to be transferred. The transfer time is intended to be shortened by this block data transfer mechanism.

As another scheme pertaining to data transfer, Japanese Patent Laid-Open No. 08-194582 is available. According to this patent reference, an asynchronization transfer count decreases to increase data reference/update processing rate. Additionally, a larger cache memory area is allocated to a data area with a high access frequency (on a magnetic disk) to effectively use a main memory, thereby shortening the data transfer time.

However, in a device such as the notebook PC 201 which supports the plurality of different communication protocols OPP and BIP, different communication protocols are required to be installed depending on mating devices in transmission/reception of object data. Hence, the amount of data handled in one transmission operation changes.

Therefore, even in transmission/reception of the same amount of object data, the data transfer time may change depending on the combination of devices or the communication protocol to be used. Hence, the schemes for shortening the data transfer time, which are disclosed in Japanese Patent Laid Open. Nos. 2001-051803 and 08-194582, cannot be directly applied.

SUMMARY OF THE INVENTION

The present invention has been made in consideration of the above problems, and has as its object to shorten a transfer time in transferring object data using a wireless communication device which supports a plurality of different communication protocols.

In order to achieve the above object, a wireless communication device in the present invention has the following arrangement. That is, a wireless communication device capable of wireless communication with a plurality of wireless terminal devices which use different communication profiles in transmission of object data, comprising:

reception unit configured to receive the object data;

storage unit configured to store the received object data;

transmission unit configured to, when the storage unit stores a predetermined amount of object data, divide the object data into blocks, and transmit the object data; and changing unit configured to change, based on a reply from a transmission destination of the object data divided into blocks by the transmission unit, an amount of the object data to be stored in the storage unit.

In the present invention, a transfer time can be shortened in transferring object data using a wireless communication device which supports a plurality of different communication protocols.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the following description, only a main message about the description of each embodiment is specified in sequence charts, and the remaining basic messages are partially omitted.

First Embodiment

A wireless communication device according to the first embodiment of the present invention will now be described with reference to FIG. 1 and FIGS. 3 to 6.

<Arrangement of Wireless Communication System>

Figure 1:
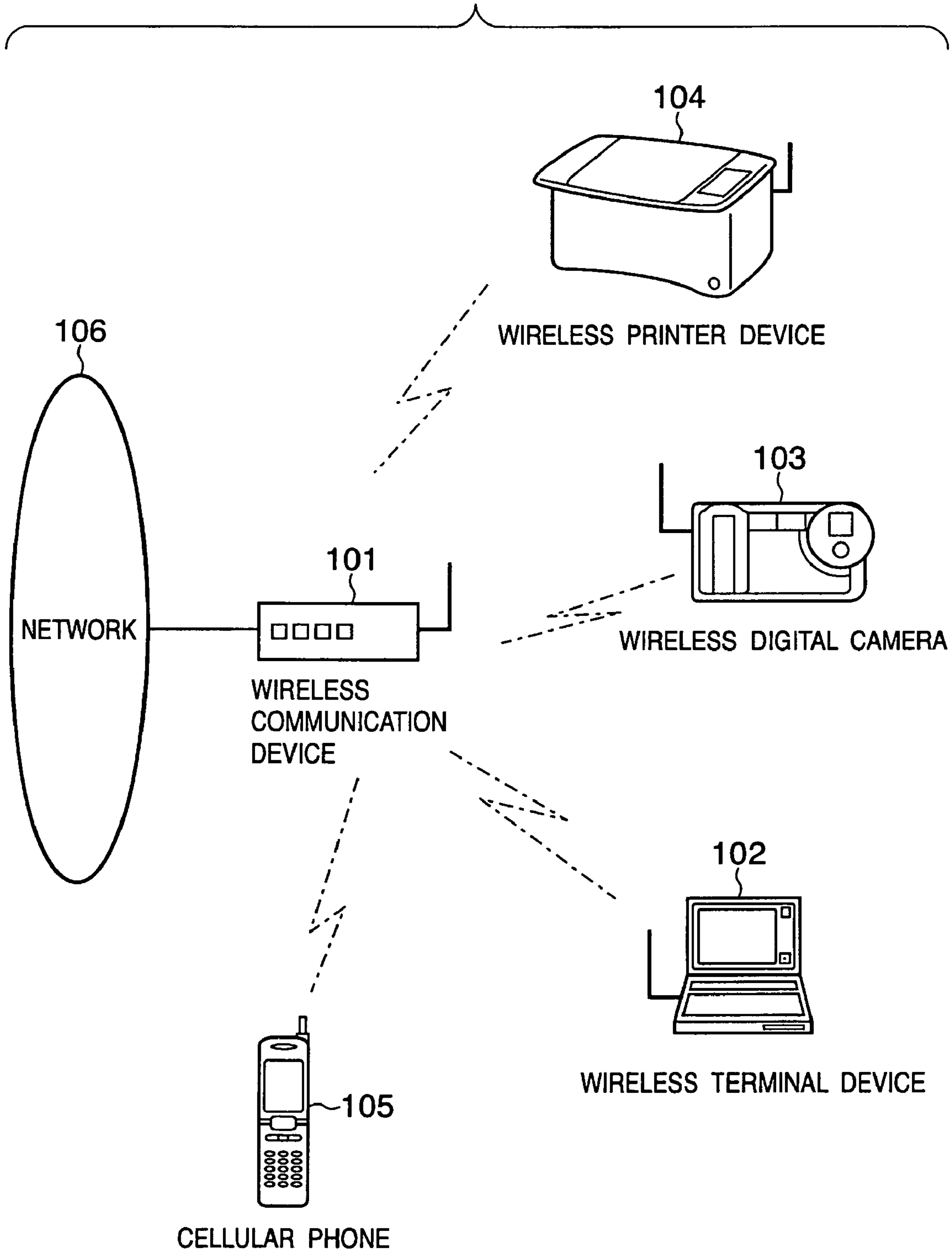
FIG. 1 is a schematic view of a wireless communication system using a wireless communication device according to an embodiment of the present invention.
Figure 2:
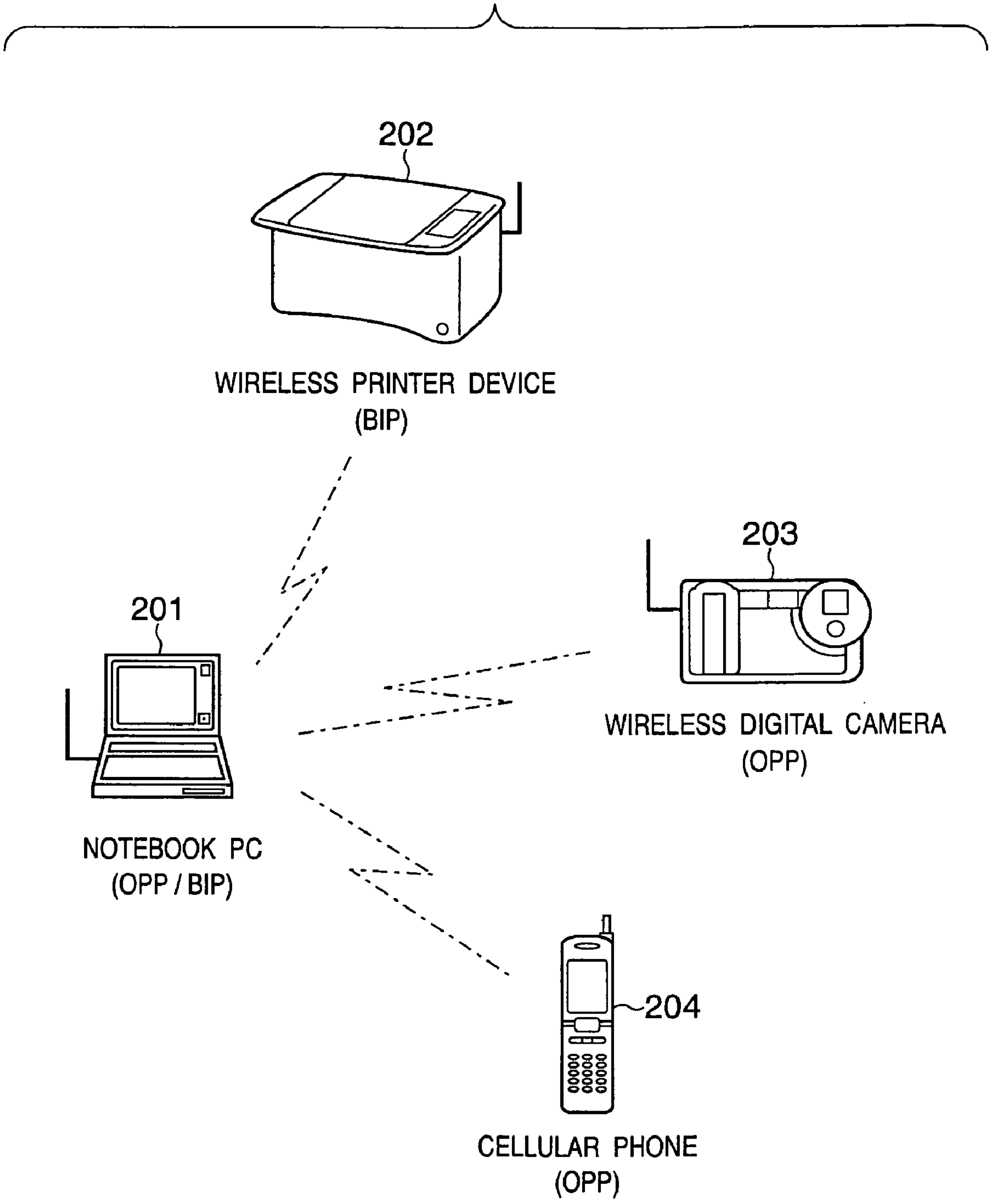
FIG. 2 is a schematic view for explaining a conventional Bluetooth wireless communication system.

FIG. 1 is a schematic view of a wireless communication system using a wireless communication device according to an embodiment of the present invention. In FIG. 1, a wireless communication device 101 supports Bluetooth as a wireless communication scheme while being connected to a network 106 using a wired interface.

The wireless communication device 101 also incorporates a wireless module (wireless interface unit) which supports both protocols BIP and OPP serving as object data transfer functions.

A wireless printer device 104 incorporates a Bluetooth device which supports the BIP. Each of a wireless digital camera 103 and a cellular phone 105 incorporates a Bluetooth device which supports the OPP. Since a wireless terminal device 102 supports both the protocols BIP and OPP, it can transmit/receive object data to/from the wireless printer device 104, wireless digital camera 103, and cellular phone 105.

<Internal Arrangement of Wireless Communication Device>

Figure 3:
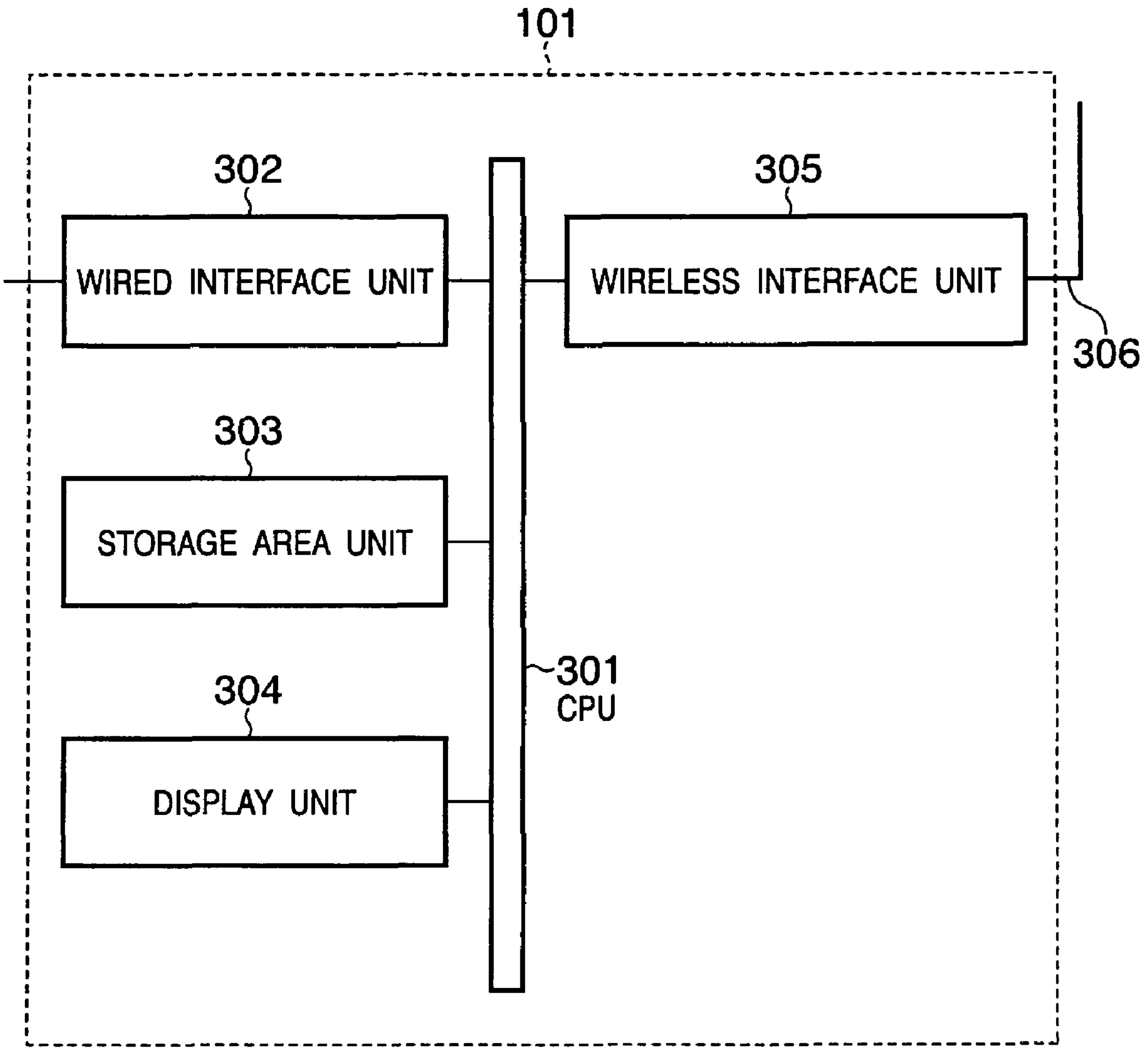
FIG. 3 is a block diagram showing the internal arrangement of a wireless communication device according to the first embodiment of the present invention.

FIG. 3 is a block diagram showing the internal arrangement of the wireless communication device 101 according to the first embodiment. In FIG. 3, reference numeral 301 denotes a central processing unit which controls the wireless communication device 101. Reference numeral 302 denotes a wired interface unit connected to the network 106 via a LAN cable.

Reference numeral 305 denotes a wireless interface unit which includes a Bluetooth stack unit (to be referred to as a BT stack unit hereinafter) for analyzing a received message, and a Bluetooth application unit (to be referred to as a BT application unit hereinafter) serving as an upper layer. The wireless interface unit 305 performs wireless communication with the wireless terminal device 102, wireless printer device 104, wireless digital camera 103, and cellular phone 105 via an antenna 306.

Reference numeral 303 denotes a storage area unit including a volatile memory which has a work area and temporary area used by each unit in the wireless communication device 101, and a nonvolatile memory in which a control program and setting data of each unit are stored.

Reference numeral 304 denotes a display unit which notifies, by an LED or LCD, an external device of the device internal status information representing the initialization, data setting, maintenance, and the like of the device.

<Processing Flow in Wireless Communication System>

Figure 4:
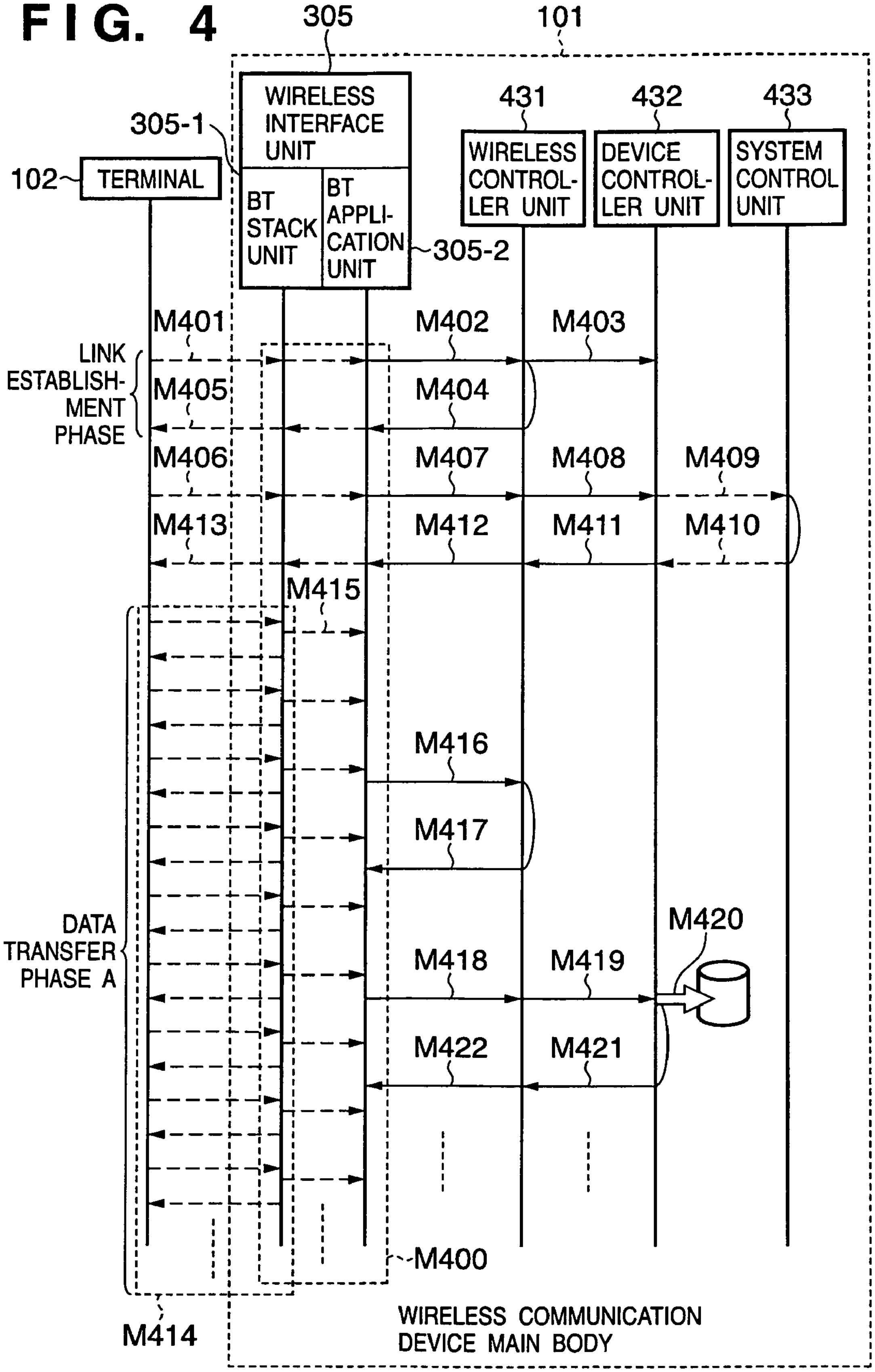
FIG. 4 is a sequence chart showing a processing flow in a wireless communication system using the wireless communication device according to the first embodiment of the present invention.
Figure 5:
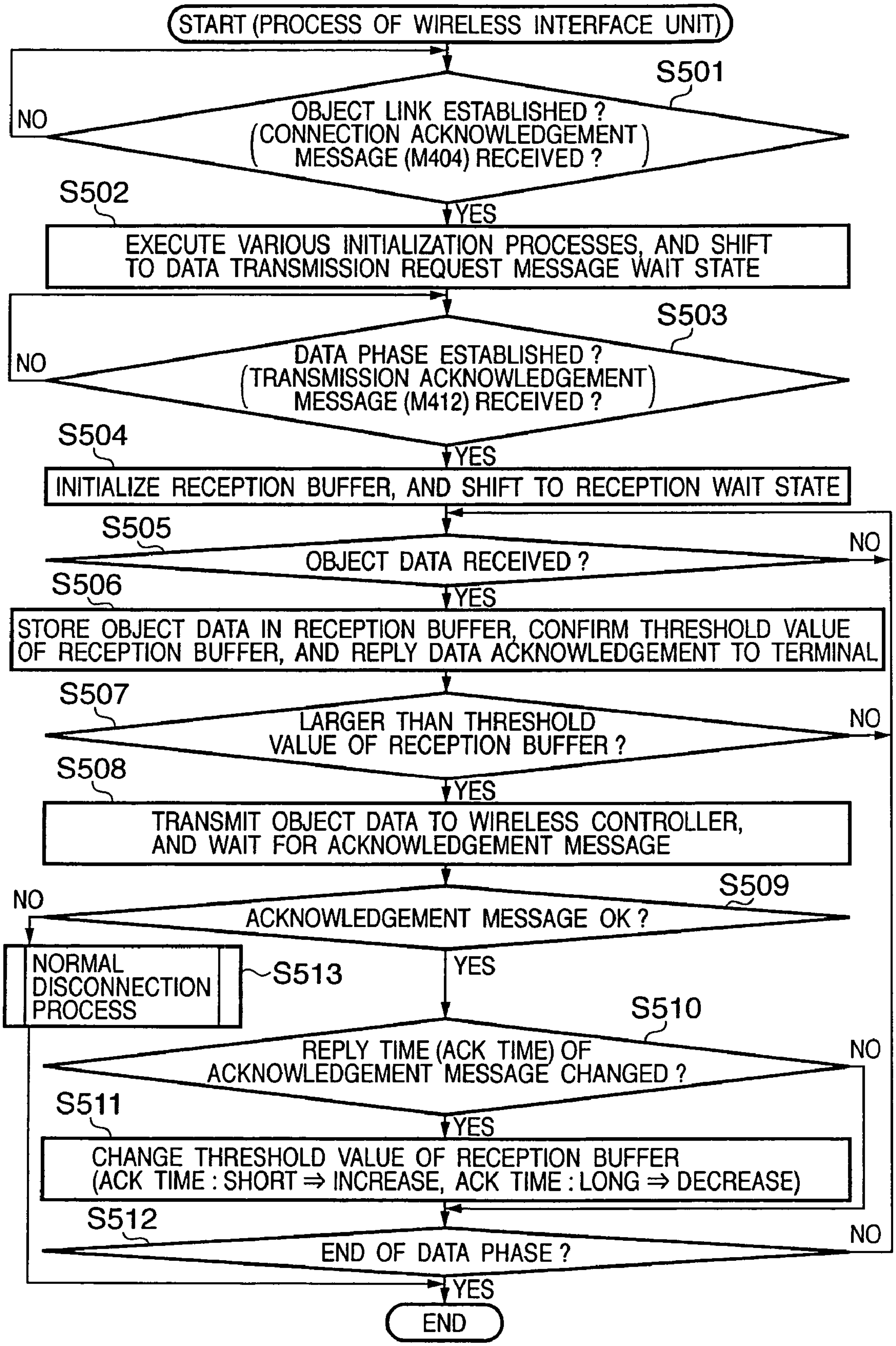
FIG. 5 is a flowchart showing a processing flow in a wireless interface unit of the wireless communication device according to the first embodiment of the present invention.
Figure 6:
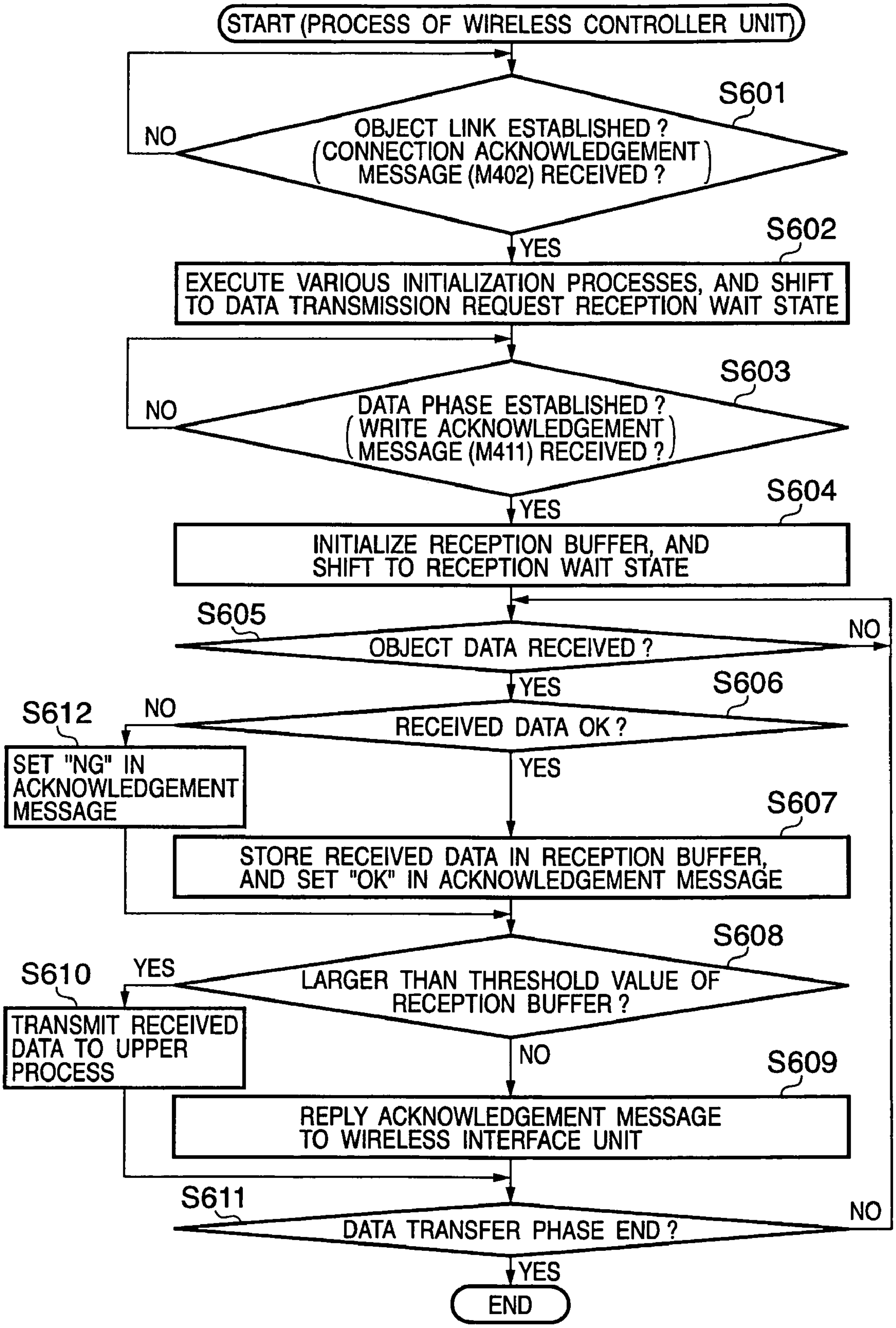
FIG. 6 is a flowchart showing a processing flow in a wireless controller unit of the wireless communication device according to the first embodiment of the present invention.

Referring to FIGS. 4 to 6, a processing flow in the wireless communication system in FIG. 1 will be described below.

FIG. 4 is a sequence chart showing a processing flow in the wireless communication system using the wireless communication device 101 according to the first embodiment. Note that in FIG. 4, the processing modules of a wireless controller unit 431, device controller unit 432, and system control unit 433 are processes included in a part of a program for controlling the wireless communication device 101.

FIG. 5 is a flowchart showing a processing flow in the wireless interface unit 305 of the wireless communication device 101 according to the first embodiment. FIG. 6 is a flowchart showing a processing flow in the wireless controller unit 431 of the wireless communication device 101 according to the first embodiment.

A case will be explained below wherein object data is to be transmitted to the wireless communication device 101 using the OPP protocol when a user operates the wireless terminal device 102.

First, the wireless interface unit 305 receives a CONN message (M401) serving as a connection request message from the wireless terminal device 102. A BT stack unit 305-1 of the wireless interface unit 305 analyzes the received message. If no problem is found, the BT stack unit 305-1 passes the received message (M400) to a BT application unit 305-2 serving as the upper layer.

The message (M400) transmitted/received between the BT stack unit 305-1 and the BT application unit 305-2 is analyzed and passed in both a link establishment phase and data transfer phase.

The BT application unit 305-2 analyzes the CONN message (M401) serving as the connection request message, and extracts an important information element (information required to check negotiation, e.g., image size and image format) in the device. The BT application unit 305-2 also converts the format of the message into a message format unique to a system, and transmits the converted message as an analyzable connection notification message (M402) to the wireless controller unit 431 serving as an upper process.

In order to notify the device controller unit 432 as an upper process of establishment of an object link, the wireless controller unit 431 which has received the connection notification message (M402) transmits a connection notification message (M403). In order to establish the object link, a connection acknowledgement message (M404) for the wireless terminal device 102 is transmitted from the wireless controller unit 431 itself to the wireless interface unit 305. In this case, the connection acknowledgement message (M404) contains information representing acceptance of establishment of the object link. This process corresponds to "YES" in step S601 in FIG. 6. After that, the wireless controller unit 431 performs various initialization processes, and shifts to a data transmission request message wait state (step S602).

The device controller unit 432 which has received the connection notification message (M403) from the wireless controller unit 431 performs various initialization processes, detects establishment of the object link, and then shifts to the data transmission request message wait state.

The BT application unit 305-2 of the wireless interface unit 305 which has received the connection acknowledgement message (M404) from the wireless controller unit 431 ("YES" in step S501) performs various initialization processes. The BT application unit 305-2 detects establishment of the object link, and shifts to the data transmission request message wait state (step S502). The connection acknowledgement message (M404) is transferred to the BT stack unit 305-1. The BT stack unit 305-1 transmits, to the wireless terminal device 102, a SUCCESS message (M405) serving as a connection acknowledgement message containing the information representing acceptance of establishment of the object link.

In order to establish the data transfer phase, the wireless terminal device 102 which has received the SUCCESS message (M405) transmits a PUT message (M406) serving as a data transmission request message to the wireless communication device 101.

When the wireless interface unit 305 receives the PUT message (M406) serving as the data transmission request message from the wireless terminal device 102, the BT stack unit 305-1 of the wireless interface unit 305 analyzes the received message. If no problem is found, the BT stack unit 305-1 passes the received message to the BT application unit 305-2 serving as the upper-layer. The BT application unit 305-2 analyzes the PUT message (M406), and extracts an information element which is important to write data to be transmitted.

Furthermore, the BT application unit 305-2 converts the format of the received message into the message format unique to the system, and transmits the converted message as a transmission request message (M407) to the wireless controller unit 431 serving as the upper process. In order to notify the device controller unit 432 serving as the upper process of a shift to the data transfer phase, the wireless controller unit 431 which has received the transmission request message (M407) transmits a write request message (M408).

The device controller unit 432 which has received the write request message (M408) from the wireless controller unit 431 transfers a write request message (M409) to the system control unit 433. The system control unit 433 analyzes the write request message (M409), and determines whether to accept a write request in accordance with object data information such as a write data size or the like. If the write request cannot be accepted, the system control unit 433 replies, to the wireless terminal device 102, a rejection message containing information representing this.

On the other hand, if the write request can be accepted, the system control unit 433 transmits, to the device controller unit 432, a write acknowledgement message (M410) containing information representing acceptance of the shift to the data transfer phase. The device controller unit 432 which has received the write acknowledgement message (M410) transfers a write acknowledgement message (M411) to the wireless controller unit 431. After that, the device controller unit 432 performs initialization processes for various reception data buffers, detects the shift to the data transfer phase, and then shifts to a data reception wait state.

The wireless controller unit 431 itself which has received the write acknowledgement message (M411) transmits a transmission acknowledgement message (M412) to the wireless interface unit 305 ("YES" in step S603 in FIG. 6). After that, the wireless controller unit 431 performs initialization processes for the various data buffers, and shifts to the data reception wait state (step S604).

The BT application unit 305-2 of the wireless interface unit 305 which has received the transmission acknowledgement message (M412) from the wireless controller unit 431 ("YES" in step S503 in FIG. 5) performs various initialization processes. The BT application unit 305-2 detects the shift to the data transfer phase, and then shifts to the data reception wait state (step S504). The BT application unit 305-2 also transfers the transmission acknowledgement message (M412) to the BT stack unit 305-1. The BT stack unit 305-1 transmits, to the wireless terminal device 102, a CONTINUE message (M413) serving as a connection acknowledgement message containing information representing acceptance of the shift to the data transfer phase.

In order to transmit object data, the wireless terminal device 102 which has received the CONTINUE message (M413) continuously transmits, to the wireless communication device 101, a data transmission message divided to have a predetermined data size, till completion of transmission (M414). The BT stack unit 305-1 of the wireless interface unit 305 which continuously receives the object data (M414) ("YES" in step S505) analyzes the received object data (M415). If no problem is found, the BT stack unit 305-1 passes the received data to the BT application unit 305-2 serving as the upper layer, and replies the acknowledgement message to the wireless terminal device 102 (step S506).

Upon reception of the object data. ("YES" in step S505 in FIG. 5), the BT application unit 305-2 stores the object data in a reception buffer (temporary area of the storage area unit 303). The BT application unit 305-2 also confirms the threshold value of the reception buffer (step S506).

If the received object data does not exceed the threshold value of the reception buffer ("NO" in step S507), the process shifts to a data receiving process (step S505). On the other hand, if the received object data exceeds the threshold value of the reception buffer ("YES" in step S507), the object data stored in the reception buffer is transmitted as a data reception message (M416) to the wireless controller unit 431.

The wireless controller unit 431 which has received the data reception message (M416) analyzes the received data (M416). If no problem about a transmission schedule length or the like is found ("YES" in step S606), the object data is stored in the reception buffer, and "OK" representing correct reception is set in an acknowledgement message (M417) (step S607). If a problem is found in the received data (M416) ("NO" in step S606), "NG" representing incorrect reception is set in the acknowledgement message (M417) (step S612).

When the received object data (M416) does not exceed the threshold value of the reception buffer ("NO" in step S608), the wireless controller unit 431 replies the acknowledgement message (M417) to the wireless interface unit 305 (step S609). The wireless controller unit 431 then confirms whether the data transfer phase is to be ended. If the data transfer phase is to be continued ("NO" in step S611 in FIG. 6), the wireless controller unit 431 shifts to the data reception wait state (step S605). If the data transfer phase is to be ended as a result of this confirmation ("YES" in step S611), the process ends.

Upon repeating the receiving process, similarly, the wireless controller unit 431 which has received an object data (M418) determines whether the received object data exceeds the threshold value of the reception buffer. If the received object data exceeds the threshold value of the reception buffer ("YES" in step S608), the wireless controller unit 431 transmits the object data stored in the reception buffer as a data reception message (M419) to the device controller unit 432 (step S610). The wireless controller unit 431 also performs an end confirmation process (step S611) of the data transfer phase.

The device controller unit 432 which has received the data reception message (M419) extracts a data portion (M420) from the data reception message, forms the extracted data portion as a file, and stores it in the storage area unit 303. Sequentially, the device controller unit 432 replies, to the wireless controller unit 431, an acknowledgement (AC) message (M421) in which "OK" is set as response confirmation. The wireless controller unit 431 which has received the acknowledgement message (M421) transmits an acknowledgement message (M422) to the wireless interface unit 305.

On the other hand, the wireless interface unit 305 which has received the acknowledgement messages (M417, M422) analyzes the response confirmation of the acknowledgement messages (M417, M422). If NG ("NO" in step S509), the wireless interface unit 305 performs a normal disconnection process (process of ending the data transfer phase and disconnecting the object link) (step S513).

The wireless interface unit 305 analyzes the response confirmation of the acknowledgement messages (M417, M422). If OK ("NO" in step S509), the wireless interface unit 305 checks a change in response time (the time between receiving the acknowledgement message M417 and receiving the acknowledgement message M422, i.e., a reply interval) from the wireless controller unit 431. Assume that the reply interval between the acknowledgement messages (M417, M422) changes ("YES" in step S510). The threshold value of the reception buffer becomes large (i.e., the reception buffer amount increases) when the reply interval becomes short. In contrast to this, the threshold value of the reception buffer becomes small (i.e., the reception buffer amount decreases) when the reply interval becomes long. As described above, the threshold value of the reception buffer is controlled in accordance with the reply interval (step S511).

When the reply interval does not change ("NO" in step S510), the wireless interface unit 305 confirms whether to end the data transfer phase. If the data transfer phase is to be continued ("NO" in step S512), the wireless interface unit 305 shifts to the data reception wait state (step S505). If the data transfer phase is to be ended ("YES" in step S512) as a result of this confirmation, the process ends.

Upon completion of the data transfer process, the device controller unit 432 notifies the system control unit 433 of the object data information (file location such as /etc/tmp/obj) formed as the file and stored in the storage area unit 303. After disconnection of the object link, the device controller unit 432 shifts to a free state. The wireless controller unit 431 and the wireless interface unit 305 also shift to the free state to end the communication.

As described above, conventionally, in the wireless communication device which supports the plurality of different communication protocols, in transmission/reception of the object data, the amount of data handled in one transmission operation changes due to different communication protocols to be installed, depending on mating devices. In the wireless communication device according to the first embodiment, in order to divide the object data into blocks, the amount of object data to be divided into blocks changes based on the reply interval between the acknowledgement messages. As a result, the object data suitable for communication condition can be transferred, and the transfer time can be shortened.

Second Embodiment

In the first embodiment, the wireless communication device 101 incorporates the Bluetooth device (wireless interface unit) which supports both the protocols BIP and OPP serving as the object file transfer function. However, the present invention is not limited to this. For example, a USB-adapter wireless module may be connected outside a wireless communication device 101.

In the first embodiment, the received object data is stored in the wireless communication device. However, the present invention is not limited to this. For example, the received object data may be transferred to another wireless terminal device.

A wireless communication device according to the second embodiment of the present invention will be described below with reference to FIG. 1, and FIGS. 7 to 12.

<Internal Arrangements of Wireless Communication Device and Wireless Module>

Figure 7:
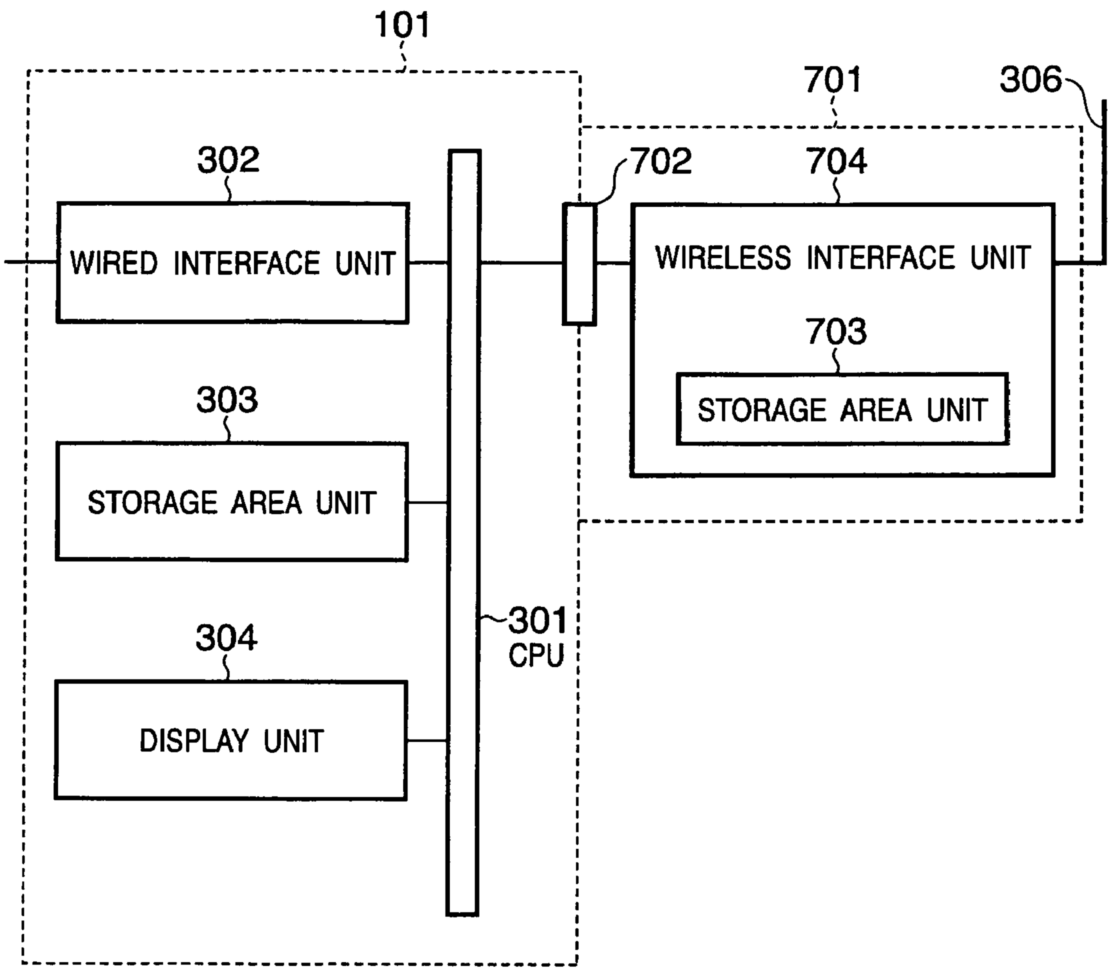
FIG. 7 is a block diagram showing the internal arrangements of a wireless communication device and a wireless module connected to the wireless communication device according to the second embodiment of the present invention.
Figure 8:
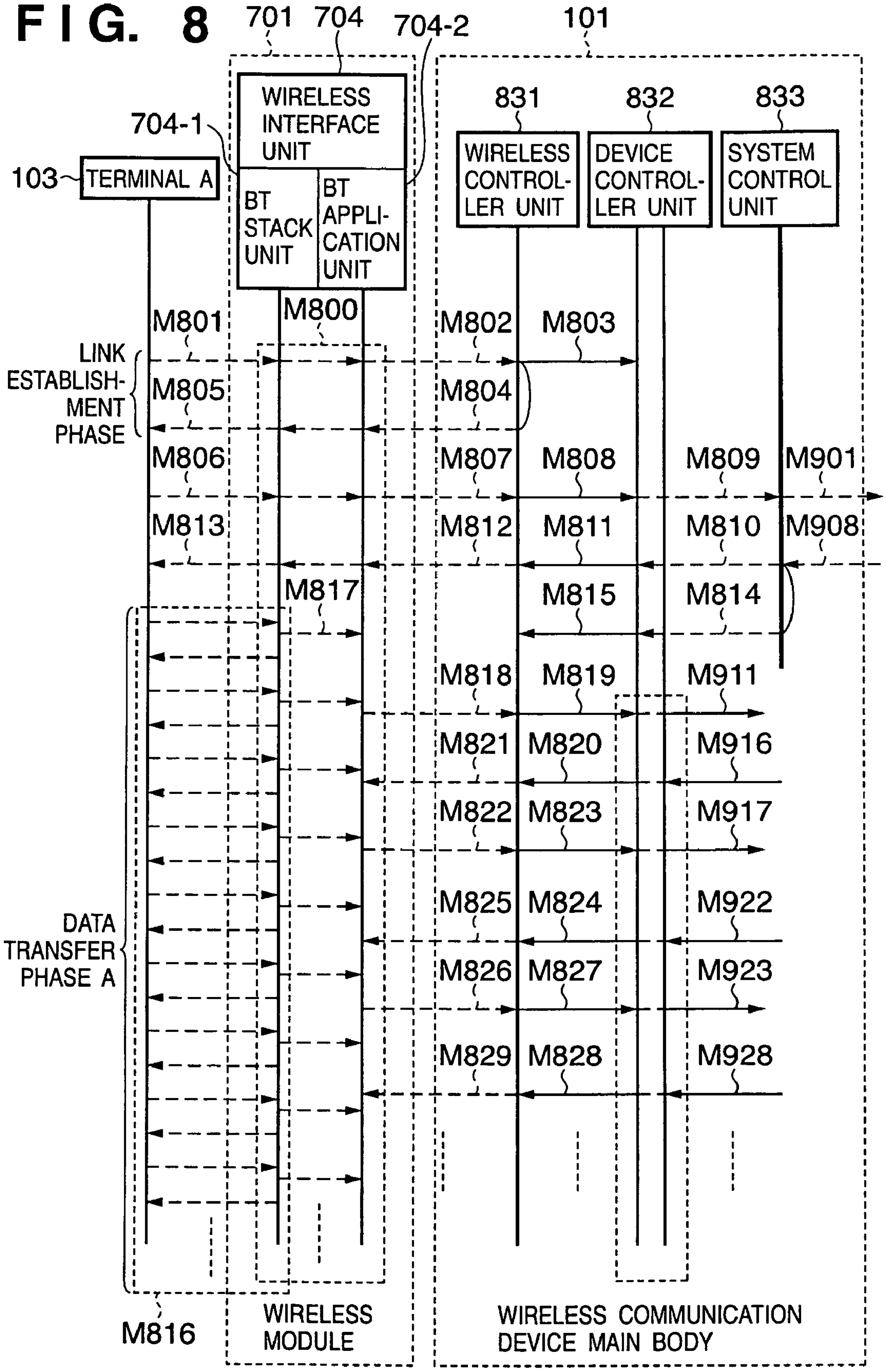
FIG. 8 is a sequence chart of a reception side process in the wireless communication device according to the second embodiment of the present invention.
Figure 9:
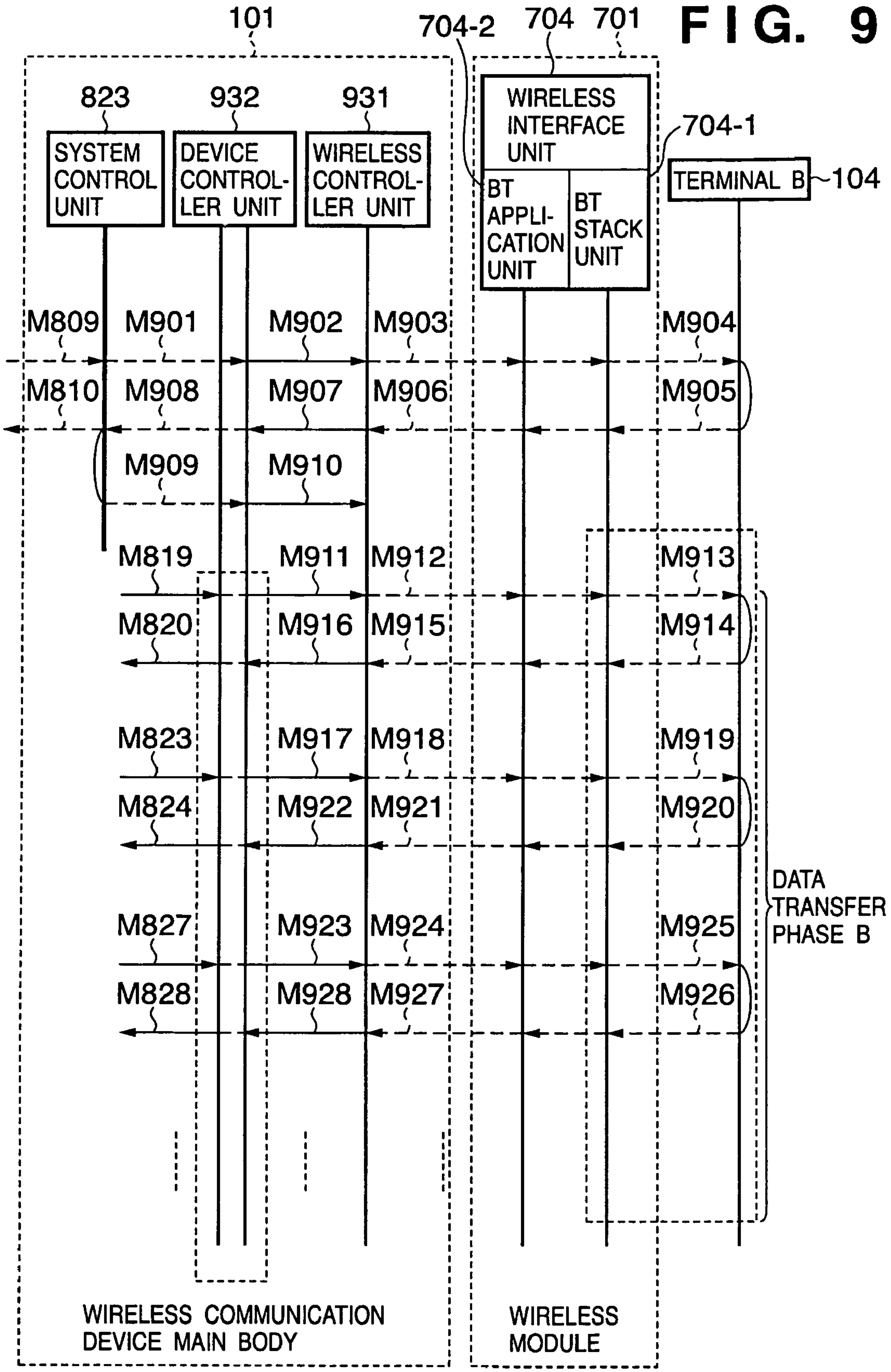
FIG. 9 is a sequence chart of a transmission side process in the wireless communication device according to the second embodiment of the present invention.
Figure 10:
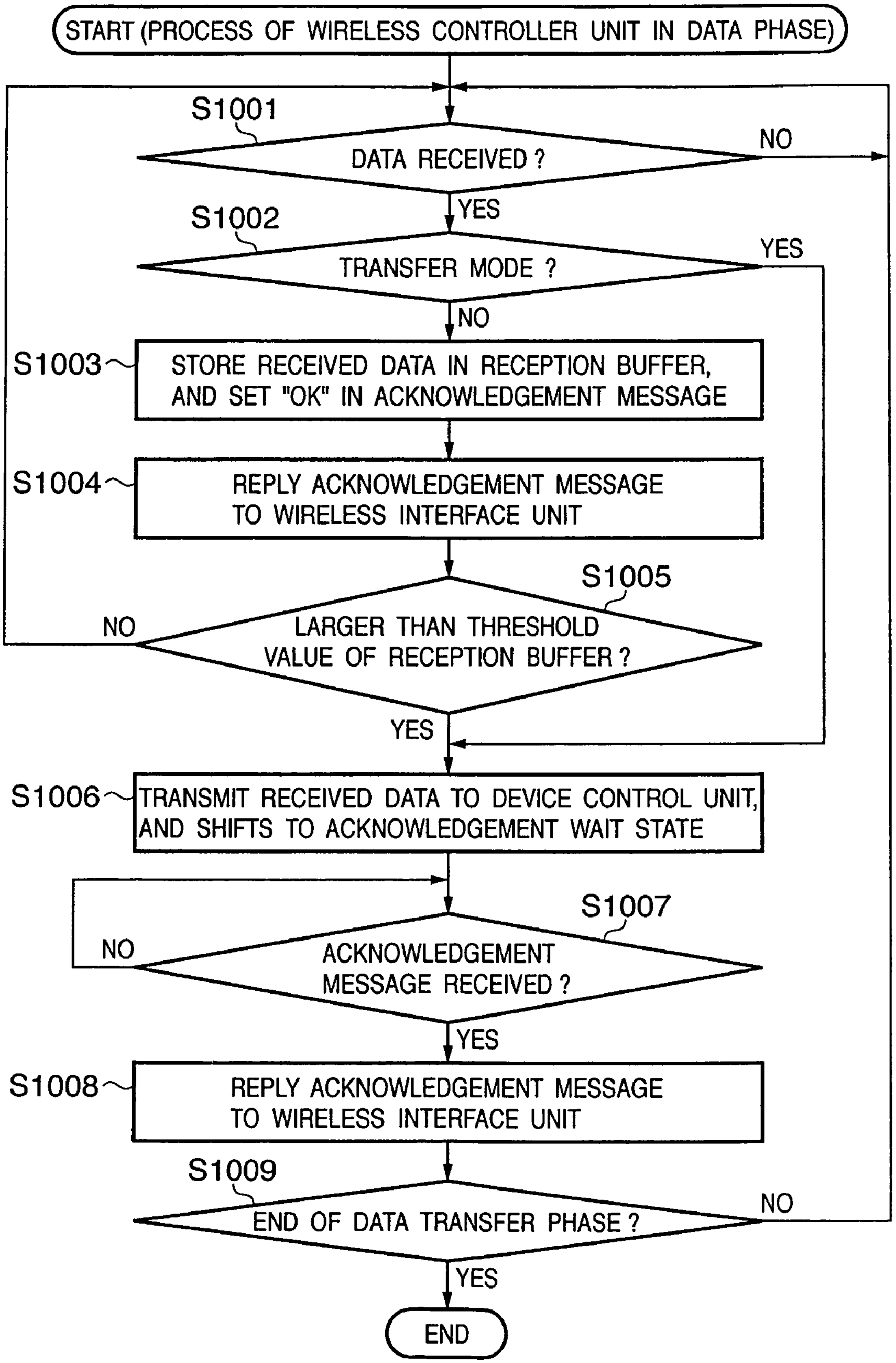
FIG. 10 is a flowchart showing a processing flow in the wireless controller of the wireless communication device according to the second embodiment of the present invention.
Figure 11:
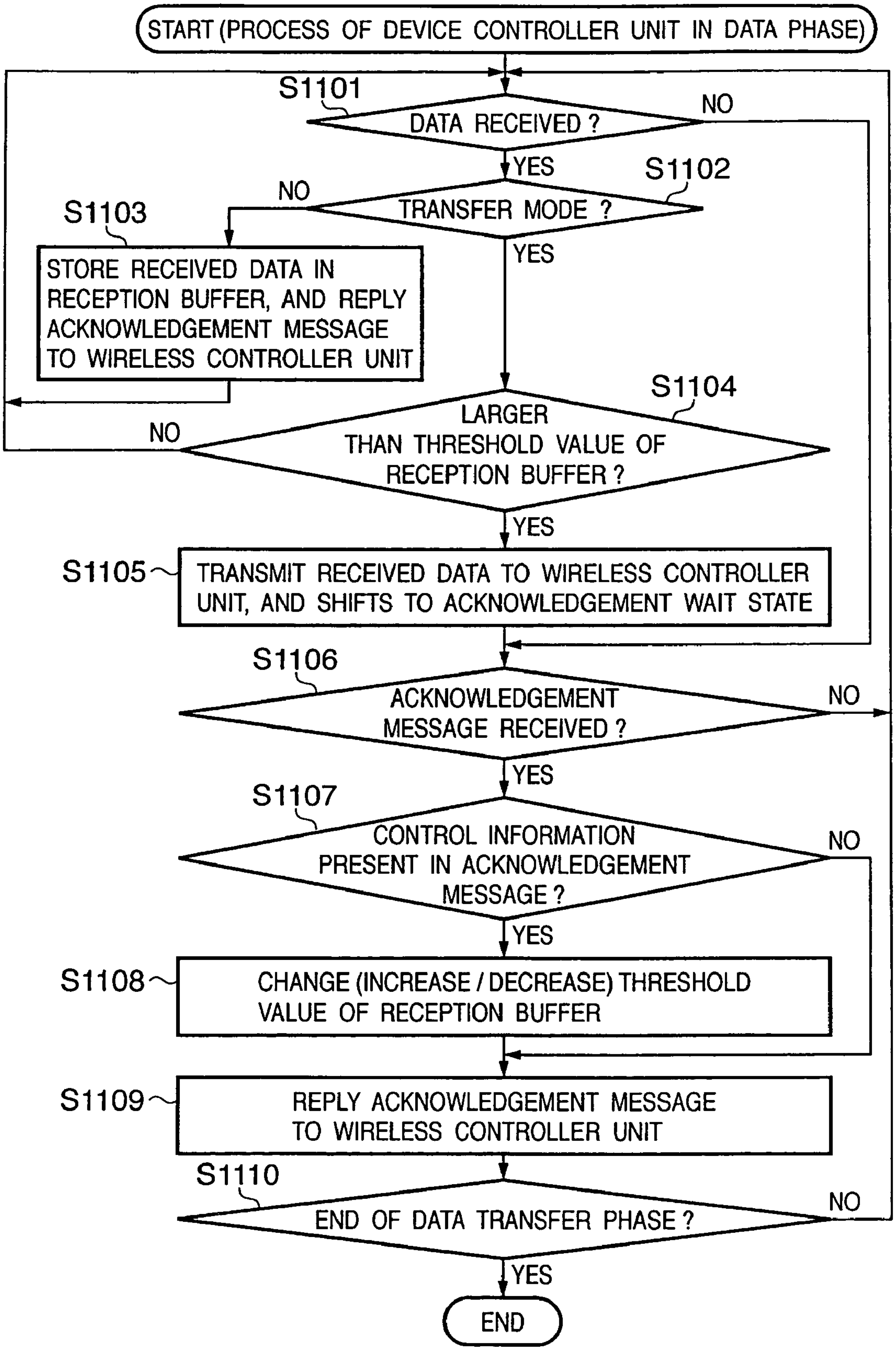
FIG. 11 is a flowchart showing a processing flow in a device controller of the wireless communication device according to the second embodiment of the present invention.
Figure 12:
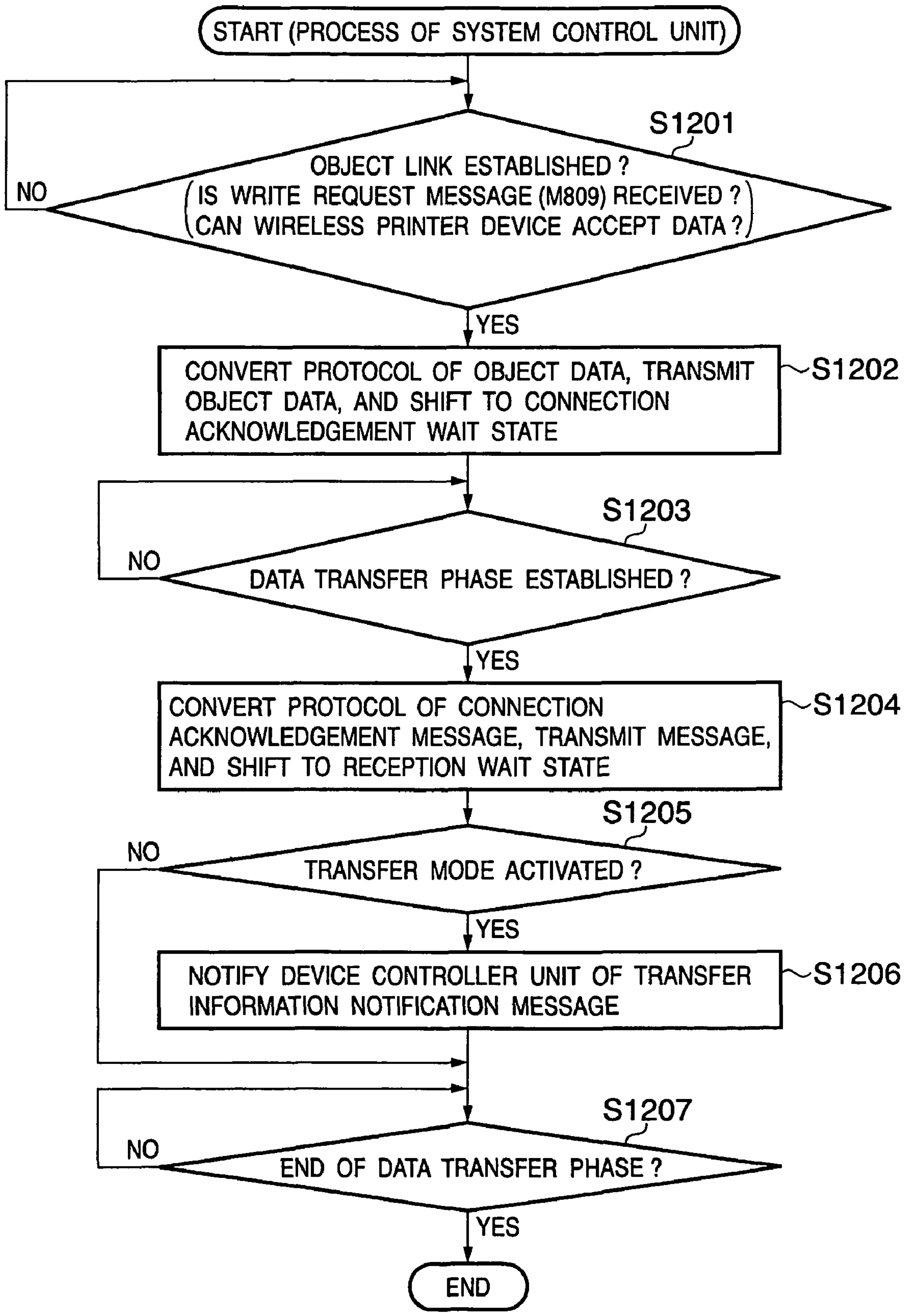
FIG. 12 is a flowchart showing a processing flow in a system control unit of the wireless communication device according to the second embodiment of the present invention.

FIG. 7 is a block diagram showing the internal arrangements of the wireless communication device and a wireless module connected to the wireless communication device according to the second embodiment. In FIG. 7, reference numerals 301 to 304, and reference numeral 306 denote the same parts as in FIG. 3.

A wireless module 701 includes a volatile memory having a work area and temporary area used by each unit in the module. The wireless module 701 also includes a storage area unit 703 having a nonvolatile memory in which the control program, setting data, and the like of the module are stored. Furthermore, the wireless module 701 includes a wireless interface unit 704 which mounts a BT stack unit for analyzing a received message and a BT application unit serving as an upper layer. The wireless module 701 is connected to the wireless communication device 101 via a device interface 702.

<Processing Flow in Wireless Communication System>

Referring to FIGS. 8 to 12, a process will be described below wherein object data is transmitted to the wireless communication device 101 using an OPP protocol when a user operates a wireless digital camera 103 or a cellular phone 105. Note that the wireless communication device 101 transmits the object data by using a BIP protocol, to a wireless printer device 104 as a relay device. Note that in the following description, a wireless terminal to be activated serves as the wireless digital camera 103.

The wireless interface unit 704 in the wireless module 701 receives a CONN message (M801) serving as a connection request message from the wireless digital camera 103. A BT stack unit 704-1 of the wireless interface unit 704 in the wireless module 701 analyzes the received message. If no problem is found, the BT stack unit 704-1 passes the received message to a BT application unit 704-2 serving as an upper layer.

The message (M800) transmitted/received between the BT stack unit 704-1 and the BT application unit 704-2 is analyzed and passed in both a link establishment phase and data transfer phase. The BT application unit 704-2 analyzes the CONN message (M801) serving as the connection request message, and extracts an important information element (information required to check negotiation, e.g., image size and image format) in the system. The BT application unit 704-2 also converts the format of the message into a message format unique to a system, and transmits, via the device interface 702, the converted message as an analyzable connection notification message (M802) to a wireless controller unit 831 serving as an upper process set in the wireless communication device 101 main body.

In order to notify a device controller unit 832 as an upper process of establishment of an object link, the wireless controller unit 831 which has received the connection notification message (M802) transmits a connection notification message (M803). In order to establish the object link, The wireless controller unit 831 itself transmits a connection acknowledgement message (M804) to the wireless interface unit 704 in the wireless module 701. In this case, the connection acknowledgement message (M804) contains information representing acceptance of establishment of the object link. After that, the wireless controller unit 831 performs various initialization processes, and shifts to a data transmission request message wait state.

The device controller unit 832 which has received the connection notification message (M803) from the wireless controller unit 831 performs various initialization processes, detects establishment of the object link, and then shifts to the data transmission request message wait state.

The BT application unit 704-2 of the wireless interface unit 704 in the wireless module 701 which has received the connection acknowledgement message (M804) from the wireless controller unit 831 performs various initialization processes. The BT application unit 704-2 detects establishment of the object link, and shifts to the data transmission request message wait state. The connection acknowledgement message (M804) is transferred to the BT stack unit 704-1. The BT stack unit 704-1 transmits, to the wireless digital camera 103, a SUCCESS message (M805) serving as a connection acknowledgement message containing the information representing acceptance of establishment of the object link.

In order to establish the data transfer phase, the wireless digital camera 103 which has received the SUCCESS message (M805) transmits a PUT message (M806) serving as a data transmission request message to the wireless communication device 101.

The wireless interface unit 704 in the wireless module 701 receives the PUT message (M806) serving as the data transmission request message from the wireless digital camera 103. The BT stack unit 704-1 of the wireless interface unit 704 in the wireless module 701 analyzes the received message. If no problem is found, the BT stack unit 704-1 passes the received message to the BT application unit 704-2 serving as the upper layer.

The BT application unit 704-2 analyzes the PUT message (M806), and extracts an information element which is important to write data to be transmitted. Furthermore, the BT application unit 704-2 converts the format of the received message into the message format unique to the system, and transmits the converted message as a transmission request message (M807) to the wireless controller unit 831 serving as the upper process.

In order to notify the device controller unit 832 serving as the upper process of a shift to the data transfer phase, the wireless controller unit 831 which has received the transmission request message (M807) transmits a write request message (M808).

The device controller unit 832 which has received the write request message (M808) from the wireless controller unit 831 transfers a write request message (M809) to the system control unit 833.

The system control unit 833 analyzes the write request message (M809), and checks object data information such as a write data size or the like, and a connection housing state of the wireless printer device 104 serving as an output destination device. The system control unit 833 then determines whether to accept the write request received from the wireless digital camera 103. If the write request cannot be accepted, the system control unit 833 replies, to the wireless digital camera 103, a rejection message containing information representing this.

On the other hand, when establishment of the object link and the shift to the data transfer phase can be accepted ("YES" in step S1201), the system control unit 833 transmits a connection request message (M901) to the wireless printer device 104. More specifically, the system control unit 833 transmits, to a device controller unit 932 which controls the wireless printer device 104, the connection request message (M901) containing information representing the request of establishment of the object link and the shift to the data transfer phase. Furthermore, the system control unit 833 shifts to the connection acknowledgement message wait state for waiting for the connection acknowledgement message from the wireless printer device 104.

In this case, when the object data communication protocol supported by the wireless printer device 104 is the BIP protocol, this operation is performed in the sequence of an OPP-BIP communication protocol conversion process. Hence, the connection request message (M901) is converted into a message which can be analyzed by using the BIP protocol, and the converted message is transmitted (step S1202).

The device controller unit 932 which has received the connection request message (M901) transfers a connection request message (M902) to a wireless controller unit 931. The wireless controller unit 931 itself which has received the write connection request message (M902) transmits a connection request message (M903) to the wireless interface unit 704 in the wireless module 701.

The BT application unit 704-2 of the wireless interface unit 704 in the wireless module 701 which has received the connection request message (M903) from the wireless controller unit 931 shifts to the object link establishment wait state. The BT application unit 704-2 transfers the connection request message to the BT stack unit 704-1. The BT stack unit 704-1 transmits, to the wireless printer device 104, a CONN message (M904) serving as a connection request message containing information representing the request of establishment of the object link and the shift to the data transfer phase.

Upon reception of the CONN message (M904), the wireless printer device 104 analyzes it. In accordance with the object data information such as the data size designated by a connection request, the wireless printer device 104 determines whether to accept the write request received from the wireless digital camera 103. If the write request cannot be accepted, the wireless printer device 104 transmits a rejection message containing information representing this to the wireless interface unit 704 in the wireless module 701.

On the other hand, when the write request can be accepted, the wireless printer device 104 transmits a SUCCESS message (M905) serving as a connection acknowledgement message to the wireless interface unit 704 in the wireless module 701. In this case, the SUCCESS message (M905) contains information representing acceptance of establishment of the object link. The wireless printer device 104 performs various initialization processes, detects the shift to the data transfer phase, and then shifts to the data reception wait state.

The BT stack unit 704-1 of the wireless interface unit 704 in the wireless module 701 receives the SUCCESS message (M905) serving as the connection acknowledgement message containing information representing acceptance of establishment of the object link. The BT stack unit 704-1 analyzes the received SUCCESS message (M905). If no problem is found, the BT stack unit 704-1 passes the received SUCCESS message to the BT application unit 704-2 serving as the upper layer.

The BT application unit 704-2 analyzes the SUCCESS message (M905) serving as the connection acknowledgement message, and extracts an important information element in the system. If no problem is found at this time, the BT application unit 704-2 performs various initialization processes in the module, detects the shift to the data transfer phase, and then shifts to the data reception wait state.

Furthermore, the BT application unit 704-2 converts the format of the SUCCESS message (M905) into a message format unique to the system. After that, the BT application unit 704-2 transmits the converted message as an analyzable connection acknowledgement message (M906) to the wireless controller unit 931 as the upper process in the wireless communication device 101 main body via the device interface 702.

The wireless controller unit 931 which has received the connection acknowledgement message (M906) transmits a connection acknowledgement message (M907) to notify the device controller unit 932 as the upper process of establishment of the object link and the shift to the data transfer phase. The wireless controller unit 931 itself detects establishment of the object link with the wireless printer device 104, performs initialization processes of various reception data buffers, and shifts to the data transmission/reception wait state.

The device controller unit 932 which has received the connection acknowledgement message (M907) from the wireless controller unit 931 transmits a connection acknowledgement message (M908) to the system control unit 833. The device controller unit 932 also performs various initialization processes, detects establishment of the object link and the shift to the data transfer phase, and then shifts to the data transmission/reception wait state.

The system control unit 833 analyzes the connection acknowledgement message (M908) received from the device controller unit 932. Upon confirmation of establishment of the object link and the shift to the data transfer phase ("YES" in step S1203), the system control unit 833 converts the connection acknowledgement message (M908) into a write acknowledgement message (M810) which can be analyzed by using the OPP protocol. Note that this conversion is performed in the sequence of an OPP-BIP communication protocol conversion process. After the converted message is transmitted to the device controller unit 832 which controls the wireless digital camera 103, the system control unit 833 shifts to the data transmission/reception wait state (step S1204).

In this case, the system control unit 833 determines whether the object data can be immediately output. In order to determine that, by analyzing the write request message (M809) from the wireless digital camera 103, the system control unit 833 detects the presence of a request to immediately output the object data. Upon detection that the wireless digital camera 103 issues the request to immediately output the object data, the system control unit 833 analyzes the connection acknowledgement message (M908) received from the wireless printer device 104, and determines whether the wireless printer device 104 can immediately output the object data.

When the system control unit 833 determines that the wireless printer device cannot immediately output the object data ("NO" in step S1205), the flow advances to step S1207. In step S1207, the object data is written from the wireless digital camera 103 to the wireless communication device 101 till completion of data transfer phase. Note that a case wherein it is determined that the object data cannot be immediately output regardless of the request from the wireless digital camera 103 includes, for example, a case wherein the power supply of the wireless printer device 104 is OFF, or a case wherein the wireless printer device 104 is executing another job processing.

On the other hand, when it is determined that the wireless printer device can immediately output the object data ("YES" in step S1205), the flow advances to step S1206. When the object data written from the wireless digital camera 103 is to be transferred to the wireless printer device 104, transfer information notification messages (M814, M909) are transmitted. More specifically, pieces of mating information (e.g., MAC address) are transmitted as the transfer information notification messages (M814, M909) to the respective device controller units 832 and 932.

The device controller unit 932 (the device controller unit for controlling the wireless printer device 104 side) which has received the transfer information notification message (M909) transmits a transfer information notification message (M910) to the wireless controller unit 931. After that, the device controller unit 932 performs initialization processes for various reception data buffers, detects the shift to the data transfer phase, and shifts to the data reception wait state for waiting for the data received from the wireless digital camera 103. After that, the device controller unit 932 performs control in a transfer mode.

The wireless controller unit 931 (the wireless controller unit for controlling the wireless printer device 104 side) which has received the transfer information notification message (M910) executes the same process as that of the device controller unit 932. That is, the wireless controller unit 931 performs initialization processes for various reception data buffers, detects the shift to the data transfer phase, and shifts to the data reception wait state for waiting for the data received from the device controller unit 932. After that, the wireless controller unit 931 performs control in the transfer mode.

The device controller unit 832 (the device controller unit for controlling the wireless digital camera 103 side) receives the transfer information notification message (M814) after reception of the write acknowledgement message (M810). After that, the device controller unit 832 performs initialization processes for various reception data buffers, detects the shift to the data transfer phase, and then shifts to a data reception wait state for waiting for the data to be transmitted to the wireless printer device 104.

Subsequently, the device controller unit 832 transfers a write acknowledgement message (M811) and transfer information notification message (M815) to the wireless controller unit 831. After that, the device controller unit 832 performs control in the transfer mode.

The wireless controller unit 831 which has received the write acknowledgement message (M811) and the transfer information notification message (M815) transmits a transmission acknowledgement message (M812) to the wireless interface unit 704 in the wireless module 701. After that, the wireless controller unit 831 performs initialization processes for the various reception buffers, and shifts to the data reception wait state. After that, the wireless controller unit 831 performs control in the transfer mode.

The BT application unit 704-2 of the wireless interface unit 704 in the wireless module 701 which has received the transmission acknowledgement message (M812) from the wireless controller unit 831 performs various initialization processes. The BT application unit 704-2 detects the shift to the data transfer phase, and then shifts to the data reception wait state. The BT application unit 704-2 also transfers the transmission acknowledgement message to the BT stack unit 704-1. The BT stack unit 704-1 transmits, to the wireless digital camera 103, a CONTINUE message (M813) serving as a connection acknowledgement message containing information representing acceptance of the shift to the data transfer phase.

In order to transmit object data, the wireless digital camera 103 which has received the CONTINUE message (M813) continuously transmits, to the wireless communication device 101, a data transmission message divided to have a predetermined data size, till completion of transmission (M816). The BT stack unit 704-1 of the wireless interface unit 704 in the wireless module 701 which continuously receives the data (M817) analyzes the received data (M817). If no problem is found, the BT stack unit 704-1 passes the received data to the BT application unit 704-2 serving as the upper layer, and replies the acknowledgement message to the wireless digital camera 103.

Upon reception of the data, the BT application unit 704-2 stores the received data in a reception buffer (temporary area of the storage area unit 703). The BT application unit 704-2 also confirms the threshold value of the reception buffer. If the received object data does not exceed the threshold value of the reception buffer, the process shifts to a data receiving process. On the other hand, if the received object data exceeds the threshold value of the reception buffer, the received data stored in the reception buffer is transmitted as a data reception (1) message (M818) to the wireless controller unit 831. The wireless controller unit 831 which has received the data reception (1) message (M818) ("YES" in step 1001) analyzes the received data (M818). If no problem about a transmission schedule length or the like is found, the control mode is confirmed.

If the control mode is not the transfer mode ("NO" in step S1002), the received data is stored in the reception buffer, and "OK" representing correct reception is set in an acknowledgement message (step S1003). If a problem is found in the received data, "NG" representing incorrect reception is set in the acknowledgement message.

The wireless controller unit 831 replies the acknowledgement message to the wireless interface unit 704 in the wireless module 701 (step S1004). Sequentially, when the received data (M818) does not exceed the threshold value of the reception buffer ("NO" in step S1005), the wireless controller unit 831 shifts to the data reception wait state again (step S1001). When the received data (M818) exceeds the threshold value of the reception buffer ("YES" in step S1005), the wireless controller unit 831 transmits, to the device controller unit 832, the stored received data whose amount is larger than the threshold value, and shifts to the acknowledgement wait state (step S1006).

Assume that in the wireless controller unit 831, the control mode of the data (M818) received from the wireless digital camera 103 via the wireless interface unit 704 is the transfer mode ("YES" in step S1002). In this case, the wireless controller unit 831 transmits a data reception (1) message (M819) to the device controller unit 832, and shifts to the acknowledgement wait state (step S1006).

Upon reception of the data reception (1) message (M819) ("YES" in step S1101), the device controller unit 832 for controlling the wireless digital camera 103 side analyzes the received data (M819). If no problem about the transmission schedule length or the like is found, the device controller unit 832 confirms the control mode. If the control mode is not the transfer mode ("NO" in step S1102), the device controller unit 832 extracts a data portion from the data reception (1) message (M819), forms the extracted data as the file, and stores it in the storage area unit 303. The device controller unit 832 replies, to the wireless controller unit 831, an acknowledgement message (M820) in which "OK" is set as the response confirmation (step S1103). The wireless controller unit 831 which has received the acknowledgement message transmits an acknowledgement message (M821) to the wireless interface unit 704 in the wireless module 701.

The device controller unit 832 for controlling the wireless digital camera 103 side confirms the control mode. If the control mode is the transfer mode as a result of this confirmation ("YES" in step S1102), the device controller unit 832 determines whether the received data (M819) exceeds the threshold value of the reception buffer. If the received data does not exceed the threshold value ("NO" in step S1104), the device controller unit 832 shifts to the data reception wait state (step S1101) again.

If the received data (M819) exceeds the threshold value of the reception buffer ("YES" in step S1104), the device controller unit 832 passes the data reception (1) message (M819). More specifically, in accordance with transfer destination information included in the transfer information notification message (M814), the device controller unit 832 passes the stored received data whose amount is larger than the threshold value, t6 the device controller unit 932 which controls the wireless printer device 104 side serving as a transfer destination.

The device controller unit 932 which controls the wireless printer device 104 side serving as the transfer destination transmits a data reception (1) message (M911) to the wireless controller unit 931. Note that the data reception (1) message (M911) is obtained in an OPP-BIP protocol conversion process for the data reception (1) message (M819) as needed. After transmission, the device controller unit 932 shifts to the acknowledgement wait state (step S1105).

The wireless controller unit 931 which has received the data reception (1) message (M911) transmits a data reception (1) message (M912) to the wireless interface unit 704 in the wireless module 701.

The BT application unit 704-2 of the wireless interface unit 704 in the wireless module 701 which has received the data reception (1) message (M912) from the wireless controller unit 931 transmits the message to the BT stack unit 704-1. The BT stack unit 704-1 transmits, to the wireless printer device 104, a PUT message (M913) serving as a data message containing information representing data transmission.

Upon reception of the PUT message (M913), the wireless printer device 104 analyzes it. In accordance with the object data information such as data size designated by a connection request, the wireless printer device 104 determines whether to accept the write request from the wireless digital camera 103. If the write request cannot be accepted, the wireless printer device 104 transmits, to the wireless interface unit 704 in the wireless module 701, a rejection message containing the information representing this.

On the other hand, if the PUT message (M913) can be accepted, the wireless printer device 104 transmits a CONTINUE message (M914) as an acknowledgement message to the wireless interface unit 704 in the wireless module 701. Note that the CONTINUE message (M914) contains object data acknowledgement and information representing that the object data can be further transmitted. After transmission, the data reception wait state is continued.

In this case, by using the reception application of the wireless printer device 104, the reception application buffer state is included in the part of the CONTINUE message (M914) serving as the acknowledgement message. The buffer state indicates information representing whether the reception application can accept the object data. Note that the confirmation control information is included when the reception application cannot accept the object data (for example, when the wireless printer device 104 does not support the communication protocol BIP or OPP, or when data format/size mismatch occurs).

The BT stack unit 704-1 of the wireless interface unit 704 in the wireless module 701 receives the CONTINUE message (M914) serving as the acknowledgement message. The BT stack unit 704-1 passes the CONTINUE message (M914) to the BT application unit 704-2 serving as the upper layer.

The BT application unit 704-2 analyzes the CONTINUE message (M914) serving as the acknowledgement message. If no problem is found, the data reception wait state is continued. Furthermore, the format of the CONTINUE message (M914) is converted into the message format unique to the system. The BT application unit 704-2 then transmits, via the device interface 702, the converted message as an analyzable acknowledgement (1) message (M915) to the wireless controller unit 931 serving as the upper process installed in the wireless communication device 101.

The wireless controller unit 931 which has received the acknowledgement (1) message (M915) ("YES" in step S1007) performs an operation for notifying the device controller unit 932 serving as the upper process of transmission acknowledgement of the data (1) transmission message. More specifically, the wireless controller unit 931 transmits an acknowledgement (1) message (M916) (step S1008), and the data transfer phase is continued ("NO" in step S1009).

The device controller unit 932 which has received the acknowledgement (1) message (M916) from the wireless controller unit 931 ("NO" in step S1101 and "YES" in step S1106) analyzes the message. If the confirmation control information is present ("YES" in step S1107), the device controller unit 932 checks the confirmation control information from the wireless controller unit 931.

When the confirmation control information of the acknowledgement (1) message (M916) represents a buffer full state, the threshold value of the reception buffer is controlled to be made small, i.e., to decrease the reception buffer amount. When the confirmation control information represents a buffer empty state, the threshold value of the reception buffer is controlled to be made large, i.e., to increase the reception buffer amount (step S1108).

When no confirmation control information is present ("NO" in step S1107), the data acknowledgement (1) message (M916) is passed to the device controller unit 832 which controls the wireless digital camera 103 side. The data acknowledgement (1) message (M916) is passed in accordance with the mating information included in the transfer information notification message (M910).

The device controller unit 832 which controls the wireless digital camera 103 side serving as a transfer source transmits, to the wireless controller unit 831, the data acknowledgement message (M820) with respect to the data acknowledgement (1) message (M916). Note that the device controller unit 832 performs the BIP-OPP protocol conversion process for the acknowledgement message (M820) as needed. After that, the data transfer phase is continued as the transfer data reception wait state ("NO" in step S1110).

The wireless controller unit 831 which has received the data acknowledgement (1) message (M820) transmits the data acknowledgement (1) message (M821) to the wireless interface unit 704 in the wireless module 701. After that, the data reception wait state is continued. The wireless interface unit 704 which has received the acknowledgement message (M821) then analyzes the message (M821). If transmission acknowledgement is NG, the normal disconnection process is performed (i.e., the data transfer phase ends, and the object link is disconnected).

If the transmission acknowledgement is OK, the data transfer process is repeated till completion of transmission of the object data from the wireless digital camera 163, while performing control of the threshold value of the reception buffer and the protocol conversion process. Note that control of the threshold value of the reception buffer is described by using the messages M818 to M821 and messages M911 to M916.

The messages M818 to M821 and messages M911 to M916 correspond to messages M822 to 825 and messages M917 to M922, or messages M826 to M829 and messages M923 to M928.

Upon completion of the data transfer process, the device controller unit 932 notifies the system control unit 833 of the completion of communication, and shifts to the free state after disconnecting the object link. The wireless controller unit 931 and the wireless interface unit 704 in the wireless module 701 also shift to the free state to end communication.

As is apparent from the above description, in the second embodiment, in accordance with the application to be activated in the wireless terminal device serving as the transfer destination, the acknowledgement processes for the object data transmission terminal are switched. As a result, with regard to storage of the object data, transmission/reception control is optimized depending on the communication condition. Accordingly, a problem such as a delay, retransmission, or the like in data transmission/reception is solved, and the data transfer time is shortened.

In the transfer process while converting the communication protocol, the data is directly transmitted to the upper module without storing data or forming data blocks in each module. Hence, a system resource can be prevented from being run out.

Third Embodiment

In the first and second embodiments, depending on the housing state of the peripheral device, the system control unit 833 determines whether the object data from the wireless digital camera is to be stored in the wireless communication device or output to the wireless printer device. However, the present invention is not limited to this. The object data may be stored or transferred in accordance with the file name (identification information for identifying the object data) of the object data to be transmitted.

More specifically, when there is established a numerical value "00" in the part of a file name (for example, 00TEST.JPG), e.g., at the top of the file, the object data may be output to the wireless printer device, and otherwise, the object data may be stored in the wireless communication device.

In the first embodiment, the wireless communication device 101 incorporates the wireless interface unit 305. However, as the second embodiment, the wireless interface unit 305 may serve as a USB-adapter wireless module, and be connected outside the wireless communication device 101.

In the second embodiment, the reception application buffer state is included as the confirmation control information in an acknowledgement message (M914). However, the present invention is not limited to this. For example, a device controller unit 932 may monitor the increase/decrease of the reply interval between the acknowledgement messages (e.g., the interval between acknowledgement messages M916 and M922), and the monitor result may be included as the confirmation control information. As a result, a wireless interface unit 704 can change the data amount of the object file to be divided into blocks, based on the reply interval between the acknowledgement messages.

Other Embodiment

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a Floppy® disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention is not limited to the above embodiments and various changes and modifications can be made within the spirit and scope of the present invention. Therefore to apprise the public of the scope of the present invention, the following claims are made.

This application claims the benefit of Japanese Application No. 2005-112659 filed on Apr. 8, 2005, which is hereby incorporated by reference herein in its entirety.

What is claimed is:

1. A wireless communication device, comprising:

a reception unit configured to receive data transmitted from a first communication apparatus;

a storage unit configured to store the data which is received by the reception unit from the first communication apparatus;

a relay unit configured to, in a case that said storage unit stores a predetermined amount of the data, transmit the predetermined amount of the data stored in said storage unit to a second communication apparatus;

a second reception unit configured to receive a response to the data transmitted by the relay unit from the second communication apparatus;

a determination unit configured to determine an amount of data stored in a buffer of the second communication apparatus based on buffer information of the second communication apparatus included in the response received by the second reception unit; and a changing unit configured to change, based on the amount of data stored in the buffer of the second communication apparatus determined by the determination unit, the predetermined amount of the data to be received from the first communication apparatus and stored in said storage unit, wherein said changing unit increases the predetermined amount of the data to be received from the first communication apparatus and to be stored in said storage unit in a case that the buffer information indicates that the buffer of the second communication apparatus is empty, and decreases the predetermined amount of the data to be received from the first communication apparatus and to be stored in said storage unit in a case that the buffer information indicates that the buffer of the second communication apparatus is full.

2. The device according to claim 1, wherein the first communication apparatus and the second communication apparatus use different communication profiles in communication of the data.

3. An information processing method for a wireless communication device, comprising:

a reception step of receiving data transmitted from a first communication apparatus;

a storage step of storing the data which is received in the reception step from the first communication apparatus;

a relay step of, in a case that a predetermined amount of the data is stored in the storage step, transmitting the predetermined amount of the data stored in the storage step to a second communication apparatus;

a second reception step of receiving a response to the object data transmitted in the relay step from the second communication apparatus;

a determining step of determining an amount of data stored in a buffer of the second communication apparatus based on buffer information of the second communication apparatus included in the response received in the second reception step; and a changing step of changing, based on the amount of the data stored in the buffer of the second communication apparatus determined in the determining step, the predetermined amount of the data to be received from the first communication apparatus and stored in the storage step, wherein said changing step increases the predetermined amount of the data to be received from the first communication apparatus and to be stored in the storage step in a case that the buffer information indicates that the buffer of the second communication apparatus is empty, and decreases the predetermined amount of the data to be received from the first communication apparatus and to be stored in the storage step in a case that the buffer information indicates that the buffer of the second communication apparatus is full.

4. A non-transitory computer-readable storage medium which retrievably stores a control program comprising computer-executable process steps for causing a computer to execute an information processing method for a wireless communication device, the process steps comprising:

a reception step of receiving data transmitted from a first communication apparatus;

a storage step of storing the data which is received in the reception step from the first communication apparatus;

a relay step of, in a case that a predetermined amount of the data is stored in the storage step, transmitting the predetermined amount of the data stored in the storage step to a second communication apparatus;

a second reception step of receiving a response to the blocked data transmitted in the relay step from the second communication apparatus;

a determining step of determining an amount of data stored in a buffer of the second communication apparatus based on buffer information of the second communication apparatus included in the response received in the second reception step; and a changing step of changing, based on the amount of the data stored in the buffer of the second communication apparatus determined in the determining step, the predetermined amount of the data to be received from the first communication apparatus and stored in the storage step, wherein said changing step increases the predetermined amount of the data to be received from the first communication apparatus and to be stored in said storage step in a case that the buffer information indicates that the buffer of the second communication apparatus is empty, and decreases the predetermined amount of the data to be received from the first communication apparatus and to be stored in the storage step in a case that the buffer information indicates that the buffer of the second communication apparatus is full.

* * * * *